United States Patent [19]
Gross

[11] 3,723,814
[45] Mar. 27, 1973

[54] PHASE-SENSITIVE GROUND FAULT PROTECTIVE SYSTEMS

[76] Inventor: Thomas A. O. Gross, Concord Road RFD, Lincoln, Mass.

[22] Filed: May 1, 1972

[21] Appl. No.: 249,156

[52] U.S. Cl.............317/18 D, 317/27 R, 317/33 SC, 317/49
[51] Int. Cl..............................................H02h 3/28
[58] Field of Search..........317/18 D, 27 R, 33 SC, 49

[56] References Cited

UNITED STATES PATENTS

| | | | |
|---|---|---|---|
| 3,614,534 | 10/1971 | Gross | 317/18 D |
| 3,633,070 | 1/1972 | Vassos et al. | 317/18 D |
| 3,657,604 | 4/1972 | Willard | 317/18 D |

*Primary Examiner*—James D. Trammell
*Attorney*—William D. Roberson

[57] ABSTRACT

To prevent possible electrocutions and to minimize the risk of fires caused by insulation faults in alternating current power distribution systems, a protective system responsive to ground fault currents in phase with the line potentials interrupts the electrical power. Ground fault currents are detected by a sensor responsive to differential or unbalanced currents in the supply conductors of the distribution system. The unbalanced currents are compared with the phase of the line potentials by a demodulator to detect only in-phase components and produce an output signal representing a true fault, the magnitude of which depends on the degree of current imbalance. Output signals exceeding a threshold value trip a circuit breaker to remove power from the load conductors. The combination is sensitive to ground faults of either high or low resistances, and is substantially insensitive to spurious signals which do not represent true faults.

12 Claims, 3 Drawing Figures

PHASE-SENSITIVE GROUND FAULT PROTECTIVE SYSTEMS

BACKGROUND

Systems and instruments for the prevention of electrocution are receiving increasing attention because of a greater recent interest in safety generally and because of the expanding opportunities for shock hazards to present themselves. The use of electrical appliances and power tools is increasing at a rate faster than that of the population. The special shock hazards presented by appliances and power tools, not to mention electrically illuminated and electrically circulated swimming pools, have stimulated the development of ground fault interrupter systems. Ground fault interrupter systems are intended to sense small differences in current in normally balanced power lines or cable. These differences may be caused by a leakage of current from one of the line conductors to ground, thus depriving the return line of some of its normal current which would establish a balance or zero difference in current at the sensor. As long as the difference current is below a predetermined level, typically about 0.005 amperes, power should normally be allowed to flow uninterrupted. If a larger difference current occurs, the circuit should be interrupted, since it is then probable that a malfunction of insulation or perhaps even a serious shock to a human being is occurring.

One such ground fault interrupter system is described and claimed in my U.S. Pat. No. 3,614,534 on improvements in "Ground Fault Responsive Electrical Protective Systems" issued Oct. 19, 1971. Ground fault interrupting systems or ground fault indicators involve challenging technical problems, since they should be able to detect very small differences in relatively large currents. A difference of 5 milliamperes in a normal line current of 50 amperes is a typical requirement. Although a sensitivity of 1 part in 10,000 can readily be achieved in the laboratory, formidable problems arise in practical field use due to spurious signals which can be confused with real fault currents. For example, power line transients due to sudden load changes or lightning can cause nuisance tripping. Intolerance to frequent nuisance tripping can cause the users of such equipment to establish sensitivity specifications at dangerously high levels. Indeed, the ground fault interrupters accepted for common use in Europe and in Africa are said to respond typically to approximately 25 milliamperes, a level which is considered to be well above the shock tolerance of many people. A steady-state spurious signal frequently encountered is a capacitive current from the high line side to ground. This can be caused by a long buried cable or by discrete capacitors used for radio frequency interference filters or the like. Ground fault interrupter systems in the prior art have no way of discriminating against these harmless reactive currents which can therefore cause nuisance tripping.

The present invention provides a system for discriminating against reactive currents, spurious transients, indeed against any electrical signal, the wave form of which does not correspond to or correlate in phase with the line voltage. The means for this accomplishment can be simple, and the problem of nuisance tripping can be significantly reduced.

The question may arise as to whether a reactive fault current might occur which could be hazardous but which would fail to actuate the ground fault interrupting system embodying this invention. Clearly, however, it is only the "real" portion of the fault current which can cause dissipation of energy leading to fire hazards in insulation. The problem of electrocution is perhaps less obvious, but I have found by experiment that it is not possible to pass alternating currents through animal tissue or flesh without the production of "real" components detectable by the improved ground fault indicating and interrupting systems described herein.

One startling experiment with a system embodying this invention shows that a substantial reactive fault current, simulated by a discrete capacitor connected directly from a power line to ground, does not signal the interrupter. The inclusion of a turkey carcass in series with the same capacitor, however, quickly trips the circuit breaker, responding to the existance of a genuine fault. The point to emphasize here is that the addition of the flesh as a series resistance reduces the absolute magnitude of the current imbalance, but raises the phase correlation sufficiently to actuate the ground fault interrupter system.

DETAILED DESCRIPTION

Figure 1:
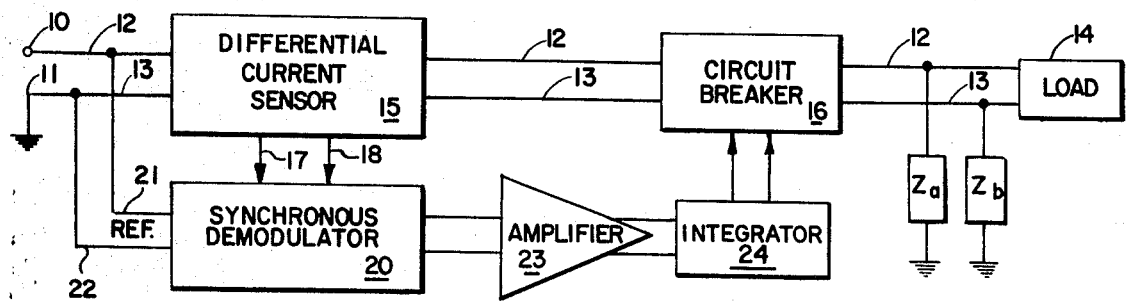
FIG. 1 is a simplified block diagram of a synchronous ground fault interrupting system in accordance with this invention.

To illustrate the principles of this invention, the simplified block diagram of FIG. 1 will serve as a general example of a phase-sensitive ground fault detecting and circuit interrupting system constructed according to the principles of this invention. Supply terminals 10 and 11 are intended to be connected to a source of alternating current potentials for supplying electrical power over conductors 12 and 13 to any suitable load represented generally at 14. Supply conductors 12 and 13 pass through a differential current sensor 15 and circuit breaker 16, although not necessarily in that particular order. Differential current sensor 15 responds to currents in conductors 12 and 13 to generate a signal over connections 17 and 18 responsive to any difference in currents in the supply conductors. Under normal system functioning, the currents in one conductor are equal and opposite to those in the other conductor and the differential current sensor 15 generates no output signal.

In FIG. 1 two potential trouble points are represented by impedances $Z_a$ and $Z_b$ respectively. These represent possible paths for current to flow to ground from either side of the load 14. A current in either of these hypothesized impedances bypasses the normal current path back to the grounded supply terminal 11. This results in a difference between the currents in conductors 12 and 13. Thereupon the differential current sensor 15 generates a signal characterizing the ground fault. This signal can have different phase relationships to the phase of the source, depending on whether the ground fault is reactive or resistive or both.

Synchronous demodulator 20 connected to receive the ground fault characterizing signals over lines 17 and 18 also receives a reference signal over lines 21 and 22 from the supply conductors 12 and 13. The synchronous demodulator 20 has a number of functions, about which more will be said below. Among these functions is to demodulate the ground fault characterizing signal against the reference signal to generate an in-phase ground fault signal representing the resistive component of the ground fault characterizing signal. This in-phase component, small in comparison with the currents in the supply conductors, should preferably be amplified by amplifier 23 and integrated by integrator 24. When the integrated signal exceeds a predetermined threshold value, the circuit breaker 16 interrupts the currents in supply conductors 12 and 13.

Hypothesized impedances $Za$ and $Zb$ can be taken to represent any kind of leakage path to ground. All leakage paths, however, are not necessarily faults. For example either impedance could result from a capacitive coupling between one of the supply lines and ground; a coupling, furthermore, that dissipates no power and represents no true fault. Such currents pose no shock hazard. In such a case the differential current sensed by sensor 15 is 90° out of phase with the potentials across the supply conductors 12 and 13. The synchronous demodulator, sensing an out-of-phase condition, produces no output signal capable of causing the circuit breaker to open the supply circuit. But should either of the hypothesized impedances contain a resistive component, the results are different. Resistive or in-phase components pose a real safety hazard if the current level is sufficiently high. Resistive or in-phase components, because they dissipate power, can cause fires and can bring about electrocution of individuals. The synchronous demodulator sorts out the in-phase component, and delivers an output signal which, if it is of sufficient magnitude, causes the circuit breaker 16 to trip.

Figure 2:
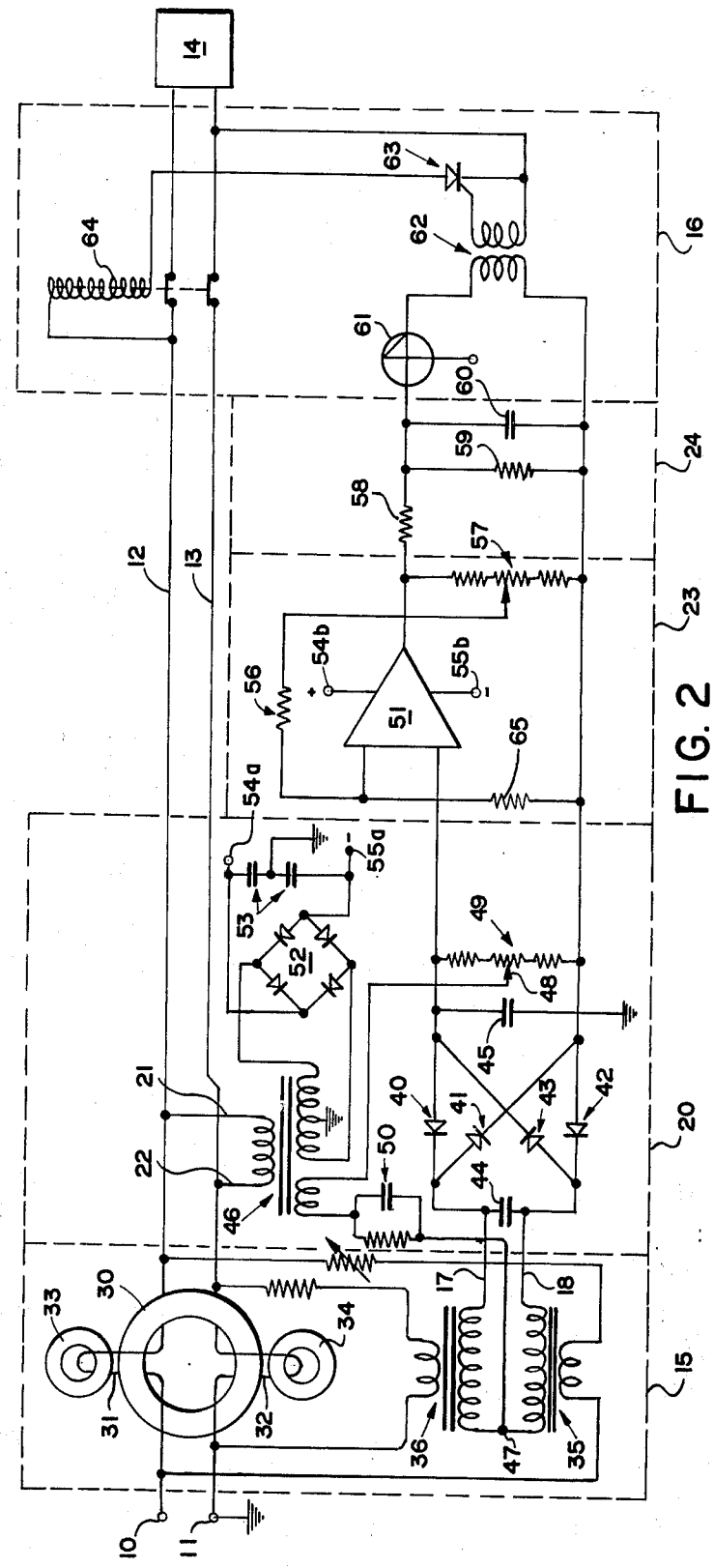
FIG. 2 is a schematic circuit of a preferred form of the invention.

A circuit diagram of one of the preferred embodiments of the invention is shown in FIG. 2, which contains all of the functional components previously described, identified by the same reference numerals applied to the block diagram of FIG. 1. In the embodiment the Differential Current Sensor 15 comprises a differential impedance combination generally of a type described and claimed in U.S. Pat. No. 3,614,534 which issued Oct. 19, 1971. The differential impedance combination shown comprises a principal magnetic circuit defined by a toroidal core 30 of highly permeable material upon which are wound a plurality of windings 31 and 32, one for each of the supply conductors of the power supply circuit. Windings 31 and 32 are wound such that the common mode currents flowing within them set up equal and opposite fluxes in the core 30. As a consequence, the magnetic fluxes due to common mode currents cancel each other and no potentials are induced in either winding. Each winding does experience a potential drop, however, as a result of the IR drop therein plus a drop due to leakage reactance times the current. In addition to the principal magnetic circuit, two auxiliary magnetic circuits are provided by additional toroidal cores 33 and 34 each linked by a respective one of the windings 31 and 32. About these auxiliary cores more will be said below. At this point it should be sufficient to note that the purpose of the auxiliary cores is to improve the sensitivity of the differential current sensor to certain types of faults. Each of the magnetic core structures 30, 33 and 34 may be formed of wound Permalloy tape. The windings embracing these core structures may have three or four windings and need not be tightly coupled.

The differential current sensor also comprises summing transformer means including a pair of transformers 35 and 36. The primary winding of transformer 35 is connected across impedance winding 31, whereas the primary winding of transformer 36 is connected across impedance winding 32. The two secondary windings of transformers 35 and 36 are connected in series to produce a net differential current signal across conductors 17 and 18.

The synchronous demodulator 20 is essentially a phase-sensitive detector incorporating, in this preferred example, four ring-connected diodes 40, 41, 42 and 43. The input signal, if any, from the series-connected secondary windings of transformers 35 and 36 is impressed across capacitor 44. The output signal is developed across capacitor 45. A reference signal to control the switching action of the diode ring is obtained from line conductors 12 and 13 through a secondary winding of transformer 46, the primary winding of which is connected across the power lines. The reference signal so obtained is applied at points of the demodulator which are orthogonal to the input connections, namely between point 47 between the secondaries of transformers 35, 36 and point 48 at the center of a potentiometer 49 across the output capacitor. The potentiometer is adjusted until, with no input signal, the output signal is zero. The R-C circuit 50 included in series with the reference signal source is included for fine tuning purposes to adjust the relative phases between the reference signal source and the input signal source. This fine tuning may be accomplished at installation by temporarily connecting hot line 12 to ground through a substantial capacitor and adjusting the values of the R-C tuning circuit until the output of the demodulator 20 is zero.

After installation is complete, if a fault develops between either of lines 12 or 13 and ground, the imbalance in currents is detected by the differential current sensor 15, which delivers a sinusoidally varying input signal across capacitor 44. But the demodulator filters out reactive components of the input signal which are out of phase with the line potential and develops a net direct current output signal across capacitor 45 representing the resistive component of the differential current in lines 12 and 13. This output signal should preferably be amplified and for this purpose a differential operational amplifier 51 is provided.

To provide the d.c. potential to operate the amplifier, the transformer 46 may be provided with a second output winding connected to full-wave rectifier 52 having filtering capacitors 53 across its output terminals. Terminals 54a and 55a are connected to corresponding terminals 54b and 55b of amplifier 51. Amplifier 51 may preferably be a differential amplifier with one of its two input terminals grounded through resistor 65. A difference in potential between its input connections gives rise to an output signal, the magnitude of which is determined not only by the magnitude of the input differential, but also by the gain-controlling resistor 56 and the adjustment of the potentiometer 57 across which the output signal appears.

The output of operational amplifier 51 is thus a d.c. signal having a magnitude proportional to the inphase component of differential currents in the supply conductors 12 and 13. The output from amplifier section 23 is integrated by a low-pass integrating filter comprising resistor 58 in series with the parallel combination of resistor 59 and capacitor 60. This filter acts as an integrator, the time constant of which, on the order of seconds, is made as large as possible consistent with the desired system response time. The signal controlling the response of circuit breaker 16 thus appears across integrating capacitor 60.

The circuit breaker 16 is triggered in this illustrative example by a silicon unilateral switch (SUS) 61 connected to ground through the input winding of pulse transformer 62. The SUS is a silicon planar, monolithic integrated electrical circuit having thyristor characteristics closely approximately those of an ideal four-layer diode. It switches at relatively low voltages from a high resistance condition to a very low resistance condition. This occurs when the potential on capacitor 60 reaches a critical threshold value and causes a resulting pulse to be coupled through transformer 62 to the control electrode of silicon controlled rectifier (SCR) 63.

The circuit breaker 16 has its winding 64 connected in series with SCR 63 across the line conductors 12 and 13. When SCR 63 is triggered to a low resistance state, the full line potential appears across the circuit breaker winding 64 causing it to open its contacts, thereby disconnecting the load 14 from the source of potential. As illustrated, the interruption of power also removes operating potential from the circuit breaker winding. The circuit breaker should accordingly be of a latching type so that its contacts remain open after actuation until reset. The advantage of this is to be expected: the system, once triggered to disconnect, is not caused to reset by temporary interruption and restoration of line potential.

At this point some of the additional advantages from the use of the synchronous demodulator followed by an integrator used in a ground fault system bear emphasis. When two signals of identical frequency are introduced into a synchronous demodulator, the output is a steady direct current with a polarity determined by the relative phases of the two signals. If the two signals have slightly different frequencies, the output signal is no longer a steady direct current, but alternates in polarity at a frequency equal to the difference between the input frequencies. If the output of the synchronous demodulator is now integrated over a period of time much longer than the period of this difference frequency, as in the embodiment just described, then the integrated output signal becomes non-responsive to such input signals.

Indeed, with an integrator-filter having a cutoff frequency of approximately 0.6 Hz., it can be shown that the pass-band over which the system is fully sensitive is very narrow, extending from about 59.4 Hz. to 60.6 Hz. Beyond this narrow range, signals are attenuated sharply. Consequences of this are that noise and other interference signals having frequencies not closely matched to line frequency do not affect the system.

It is possible for a non-adaptive narrow band-pass filter to duplicate some of the transmission characteristics of a synchronous detector followed by an integrator. But a ground fault protective system using such a non-adaptive filter would be unworkable, since line frequencies in a.c. distribution systems often vary by more than a fraction of a cycle. Smaller power distribution plants have frequency tolerances as much as ±3 Hz. A non-adaptive narrow band filter would be useless in connection with distribution systems having such variations in supply frequency. By contrast, the system here proposed not only discriminates against harmless out-of-phase line current differentials, not only rejects transients which might otherwise cause nuisance tripping, but also neatly and accurately tracks line frequency at all times. With this system the pass-band of the demodulator-integrator combination is always precisely centered around the actual line frequency.

The insensitivity of the system to spurious signals and reactive current imbalances in the supply lines results in enhanced sensitivity of the system to true faults. Reference was made in the Background section above to an experiment with a turkey carcass. The implications of the experiment are very significant. With a substantial capacitor connecting hot line 12 to ground differential currents of some magnitude existed between the supply conductors, but the system did not react to these purely reactive currents. Then an animal carcass was inserted in series with the capacitor. The absolute value of the differential currents was thereby decreased. But because the carcass was a resistive load actually drawing power, the inphase portion of the differential currents quickly tripped the circuit breaker, interrupting power to the load and to the turkey carcass. The turkey carcass, of course, is a substitute for a human body which is similarly resistive.

An example, one of many that could be identified, involves apparatus such as a high fidelity audio amplifier with capacitors connected from line to chassis for radio frequency interference filtering. When the chassis is properly grounded, the capacitance currents can cause nuisance tripping by conventional ground fault interrupters. Because of nuisance tripping the sensitivity of the ground fault interrupter may be set undesirably high. But if the chassis is or becomes improperly grounded through contact with an individual's hand or body, a severe shock can be delivered through the line-to-line chassis capacitor. A conventional ground fault interrupter with its threshold adjusted high would not respond. A phase-sensitive ground fault interrupter can have a keener protective sensitivity and still be free of nuisance tripping.

In the description above of the auxiliary magnetic circuits provided by toroidal cores 33 and 34, it was indicated that more would be said about how these auxiliary cores improve the sensitivity of the differential current sensor to certain types of faults. Ground faults can result from insulation failure or accidental contact to ground from both the high or "hot" side and the low or neutral side of a power line. The former presents the more obvious hazard, but grounded neutral short circuits can also cause electrocution of particularly vulnerable victims such as hospital patients wired to electronic instrumentation. But a more general problem with faults in the neutral line is the automatic desensitization of the ground fault interrupter system which can thereby make it unresponsive to "hot" line faults. The simultaneous occurrance of ground faults to both sides of the line is a real possibility because in most ground fault interrupter systems a neutral fault can exist undetected indefinitely.

A fault in the neutral line downstream from the differential current sensor closes a circuit upon the neutral line sensor windings; current can circulate between the fault, the intended ground (generally at the utility transformer pole) and windings. These short-circuited turns oppose flux changes in the core structure and thus the device is desensitized.

One solution to the problem of grounded neutral short circuits is described in my U.S. Pat. No. 3,614,534, issued Oct. 19, 1971. A differential impedance is arranged to produce a large signal with a low resistance neutral line fault providing that a substantial load current is being drawn. The danger remains, however, that high and neutral faults can occur simultaneously with no load.

Desensitization of the differential current sensor by a low resistance neutral fault can be avoided if some or all of the sensor windings loop auxiliary cores of high permeability magnetic material such as those shown at 31 and 32 in FIG. 2. Fluxes induced in the auxiliary cores oppose the circulating currents and the effects of shorted turns are eliminated. These auxiliary cores may become saturated and rendered ineffective by substantial load currents but their function is not then needed. Two cores are shown in the illustration, but if the installation of the system assures unambiguous identity of the neutral line, only the auxiliary core for that line is needed.

Figure 3:
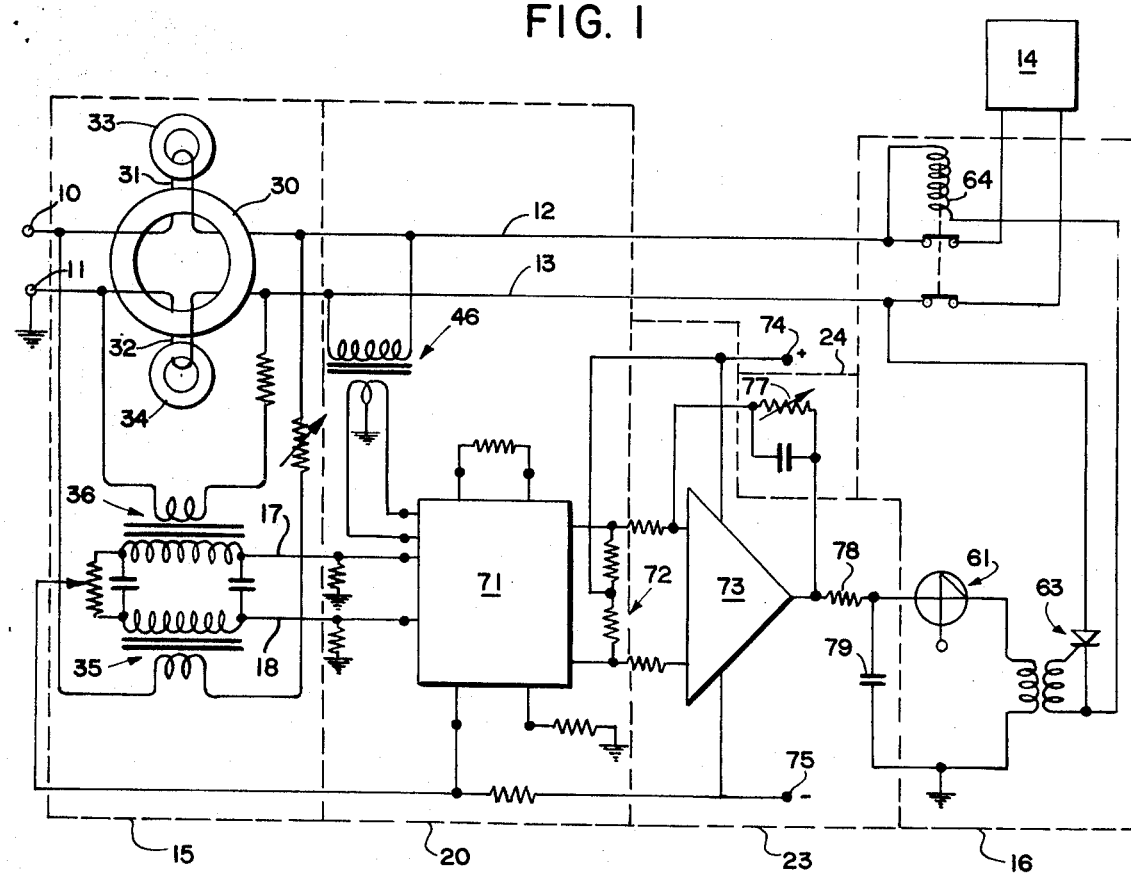
FIG. 3 is a schematic circuit of another preferred form of the invention.

An alternate embodiment of the invention is shown in FIG. 3 wherein those parts equivalent to corresponding parts of the previous illustration are identified by the same reference numbers. The passive ring modulator used in the preceding example is here replaced by a monolithic balanced demodulator 71 principally containing active elements. This may take the form of an integrated circuit available under the model designation MC1496 from Motorola Semiconductor Products, Inc., in Phoenix, Arizona. This integrated circuit comprises a quad differential amplifier driven by a differential amplifier with dual current sources, the output collectors being cross-coupled so that full-wave balance multiplication of the two input voltages occurs. That is, the output signal is a constant times the product of the two input signals. With both inputs at the same frequency the monolithic demodulator delivers an output which is a function of the phase difference between the two signals. Whereas a passive diode ring demodulator may introduce a signal loss of about 8 db., an active demodulator such as the model MC1496 may provide a signal gain of approximately 10 db. The 18 db. improvement can be used to permit the use of a smaller differential current sensor or to reduce the gain of the post-detection amplifier.

The monolithic demodulator 71 receives its input signals from summing transformers 35 and 36 and its reference signals from transformer 46. The output signal is delivered from demodulator 71 across a voltage divider 72 to the input terminals of differential operational amplifier 73. This operational amplifier is provided with a source of d.c. operating potential at terminals 74 and 75 similar to the way that the operational amplifier is shown as receiving its power in FIG. 2. Here, however, the integrator 24 comprises a capacitor 76 in the feedback loop of the operational amplifier from one of its input ports to its output terminal. This capacitor 76 together with resistor 77 determines the integrating time constant, typically in the region of from one to fifteen seconds. An additional R-C section comprising series connected resistor 78 and capacitor 79 is provided, but the principal function of these elements is to buffer the operational amplifier from transients produced by the triggering of SUS 61. Furthermore, capacitor 79 provides the pulse energy required upon triggering of SUS 61 to trigger the controlled rectifier 63 into conduction.

Many other variations in the implementation of this invention are possible in addition to those specifically shown and described. It should be understood that the foregoing examples are offered in an illustrative sense and the details of these embodiments should not limit the scope of this invention in its broader aspects.

I claim

1. A phase-sensitive ground fault protective system for use in a power distribution system for supplying a.c. power to load from at least two supply conductors, one of such conductors being grounded at the source, comprising:

differential current sensing means responsive to currents in said supply conductors for generating signals representing a differential current carried by said supply conductors; and synchronous demodulator means responsive to said differential current signals and to the phase of potentials between said supply conductors for deriving a fault-characterizing signal representing the resistive components of said differential currents in phase with the potentials across such supply conductors.

2. A phase-sensitive ground fault protective system of claim 1 wherein said demodulator means comprises principally passive biased diodes to derive said fault-characterizing signals.

3. The phase-sensitive ground fault protective system of claim 1 wherein said demodulator means comprises principally active elements to realize a signal gain in deriving said fault-characterizing signals.

4. The phase-sensitive ground fault protective system of claim 1 further including means for integrating said fault-characterizing signal to derive an integrated fault-characterizing signal.

5. The phase-sensitive ground fault protective system of claim 4 further including circuit interrupting means for interrupting continuity through said supply conductors when said integrated fault-characterizing signal exceeds a predetermined threshold level.

6. A phase-sensitive ground fault protective system for use in a power distribution system for supplying a.c. power to a load from at least two supply conductors, one of such conductors being grounded at the source, comprising:

differential current sensing means responsive to currents in said supply conductors for generating signals representing a differential current carried by said supply conductors; and phase-sensitive narrow band filter means adaptive to the frequency of said a.c. power for attenuating differential current signals which are of a different frequency then said a.c. power or which are out of phase with respect to said a.c. power and for integrating differential current signals of substantially the same frequency and phase of said a.c. power to derive an integrated signal representing the time integral of the resistive components of said differential current signals.

7. The phase-sensitive ground fault protective system of claim 6 wherein said phase-sensitive narrow band filter means comprises:

a phase-sensitive demodulator responsive to the phase of said a.c. power and to said differential current signals for generating fault-characterizing signals; and an integrator for integrating said fault-characterizing signal to derive said integrated signal.

8. The phase-sensitive ground fault protective system of claim 6 further comprising circuit interrupting means for interrupting continuity through said supply conductors when said integrated signal exceeds a predetermined threshold value.

9. A phase-sensitive ground fault protective system for use in an electrical circuit for providing a.c. power to a load from at least two supply conductors, one of such conductors being grounded at the source, comprising:

signal generating means comprising at least one closed magnetic circuit having a plurality of electrical windings thereon, each connected in series circuit with a respective one of said supply conductors and so wound about said magnetic circuit that the fluxes induced in said magnetic circuit due to normal currents in said supply conductors are in flux opposition; and means responsive to a net magnetic flux in said circuit and to the phase of alternating current potentials between said supply conductors for deriving a fault signal characterizing the resistive component of unbalanced ground fault currents.

10. The phase-sensitive ground fault protective system of claim 9 further comprising circuit interrupting means for interrupting circuit continuity between said load and said supply conductors in response to said fault signal.

11. The phase-sensitive ground fault protective system of claim 9 further comprising integrating means for deriving an integrated fault signal.

12. The phase-sensitive ground fault protective system of claim 11 further comprising means for interrupting circuit continuity between said load and said supply conductors in response to the attainment by said integrated fault signal of a predetermined threshold value.

* * * * *